United States Patent [19]
Fleury et al.

[11] Patent Number: 5,164,248
[45] Date of Patent: Nov. 17, 1992

[54] COMPOSITE POLYESTER FILMS WITH IMPROVED ADHESION AND PROCESS FOR OBTAINING THEM

[75] Inventors: Etienne Fleury; Louis Vovelle, both of Lyons; Jean-Pierre Assante, Villeurbanne; Philippe Corsi, Lyons, all of France

[73] Assignee: Rhone-Poulenc Chimie, Saint-Fons, France

[21] Appl. No.: 571,578

[22] PCT Filed: Mar. 3, 1989

[86] PCT No.: PCT/FR89/00086
§ 371 Date: Sep. 10, 1990
§ 102(e) Date: Sep. 10, 1990

[87] PCT Pub. No.: WO89/08558
PCT Pub. Date: Sep. 21, 1989

[30] Foreign Application Priority Data
Mar. 9, 1988 [FR] France .................. 88 03302

[51] Int. Cl.$^5$ .............. B32B 27/10; B32B 27/32; B32B 27/36
[52] U.S. Cl. ...................... 428/220; 428/336; 428/458; 428/480; 428/481; 428/483; 156/244.11; 264/209.5
[58] Field of Search ........... 428/480, 481, 910, 483, 428/458, 220, 336; 156/244.11; 264/209.5

[56] References Cited
U.S. PATENT DOCUMENTS

| | | | |
|---|---|---|---|
| 4,476,189 | 10/1984 | Posey et al. | 428/480 |
| 4,525,419 | 6/1985 | Posey et al. | 428/336 |
| 4,585,687 | 4/1986 | Posey et al. | 428/195 |
| 4,605,591 | 8/1986 | Nose et al. | 428/332 |

Primary Examiner—Paul J. Thibodeau
Assistant Examiner—D. S. Nakarani
Attorney, Agent, or Firm—Burns, Doane, Swecker & Mathis

[57] ABSTRACT

Oriented composite polyester films with improved adherence in respect of the various final coatings, comprising on at least one of their faces a primary adherence coating formed by co-extrusion of a common crystallizable polyester and of a copolyester with oxysulfonyl groups comprising, for 100 moles of recurrent units of dicarboxylic acid: a) from 78 to 93 moles of terephthalate units; b) from 2 to 5 moles of units derived from an aromatic diacid with one or a number of oxysulfonyl groups; c) from 5 to 17 moles of units derived from at least one alcanediacarboxylic acid comprising from 4 to 15 carbon atoms. These composite films have applications as a final coating support used in packaging, the graphic arts or metal coatings.

18 Claims, No Drawings

COMPOSITE POLYESTER FILMS WITH IMPROVED ADHESION AND PROCESS FOR OBTAINING THEM

The present invention relates to oriented composite polyester films exhibiting, in particular, an improved adhesion to various final application coatings and to a process for obtaining them.

The expression "final application coatings", as used in the present invention, indicates coatings which impart to the oriented polyester films properties which make possible extremely diverse industrial applications, well known to the expert. It is known that in the case of a number of industrial applications, the polyester films cannot be employed directly but only after deposition of a coating adapted to each type of application; examples which may be mentioned are matting coatings intended for manual drawing or for tracing tables, photosensitive coatings for photographic applications, diazo coatings for microfilms applications, printing plans or reprography, printing coatings, magnetic coatings for the acquisition of various data (sound, images, data processing), metal coatings, and coatings which modify the gas-permeability properties of polyester films employed as packaging (polyethylene, polyvinyl alcohol or polyvinylidene chloride coatings, for example).

It is also known that, owing to their nature, the bonding of final application coatings to the surface of polyester films is not easy. In fact, biaxially drawn polyester films have a relatively smooth surface and exhibit a limited chemical reactivity and a very low sensitivity to solvents. In most cases it is therefore necessary to use an "adhesion primer" coating, permitting the anchoring of the use layers, according to more or less complex chemical formulae. As a general rule, this adhesion primer (or anchor layer) is applied by the converter. It is therefore easy for the latter to adapt the nature of the primer to the ultimate application.

Film manufacturers themselves have attempted to modify the surface of the films by various means. The use of polymers of various kind as an adhesion primer has been proposed for this purpose. A particularly advantageous class of polymers employed for this purpose consists of copolyesters containing a plurality of hydrophilic groups and especially of hydroxysulphonyl groups or their metal salts (for convenience, free sulphonic acid groups or sulphonic acid salts will be denoted by the expression "oxysulphonyl group " in what follows). The deposition of adhesion primers of this type can be carried out either by coating the base film with an aqueous dispersion or solution (cf. French Patents No. 1,401,581 and 1,602,002), or by coextrusion or lamination (cf. Japanese Patent Application published under No. 79/153,883). In European Patent No. 0,129,674 it has been proposed to use copolyesters containing particular oxysulphonyl groups to obtain composite polyester films with improved adhesion having an adhesion primer deposited by coating. These copolyesters are characterized by a specific composition and in particular by the presence of 15 to 25 mol %, based on the total of the diacid repeat units, of repeat units derived from aliphatic diacids containing from 3 to 13 carbon atoms and from 6 to 15 mol % of units derived from an aromatic dicarboxylic acid containing oxysulphonyl group(s); this particular composition of the sulphonated copolyesters makes them water-dispersible and endows the anchor layers obtained with a wider range of potential applications, since they improve the adhesion of the polyester film both in the case of aqueous final application coatings and in the case of those containing organic solvents. Despite their advantage, the composite films described in European Patent No. 0,129,674 suffer from the disadvantage of having to be manufactured by coating.

The deposition of an adhesion primer of the copolyester type containing oxysulphonyl groups by coating involves resorting to copolyesters with high contents of repeat units containing oxysulphonyl groups in order to enable them to be dispersed or dissolved in water; these contents must be higher than 6 mol %. Resorting to coating, therefore, does not make it possible to adapt the content of repeat units to a value which is just sufficient to improve the adhesion properties. Moreover, high contents of repeat units containing oxysulphonyl groups impart a very high hygroscopicity to the sulphonated copolyesters, and this is reflected in difficulties in use.

On another hand, coextrusion is a process for applying an adhesion primer coating which is particularly sought after because of its advantages. In fact, coextrusion enables a particularly good bonding of the coextruded films to be obtained at their interface. However, it is poorly adapted to the deposition onto a semicrystalline polyester of a coating of sulphonated copolyesters which are highly modified, either because of a high content of repeat units containing oxysulphonyl groups or as a result of the simultaneous presence of such units and of repeat units derived from other molecules employed to impart particular properties to the sulphonated copolyesters.

Thus, it has been found that the highly modified copolyesters of the polyethylene terephthalate type as described in the abovementioned European Patent are ill-adapted to coextrusion with polyesters resulting in semicrystalline films after the usual drawing and heat-setting treatments under industrial conditions. It was found, in particular, that in the usual industrial conditions of production of semicrystalline films, sulphonated copolyesters in accordance with European Patent No. 0,129,674 do not lend themselves well to forming a film: they give rise to unstable extrusion regimes and/or to numerous breakages which make obtaining a composite film problematic. It turned out, furthermore, that the more repeat units derived from aliphatic diacids the sulphonated copolyester contains, the more the anchor layer undergoes a surface crystallization induced by the action of the solvents present in the final application coatings. This crystallization under the effect of the solvents can result in a shrinkage of the anchor layer polymer and the formation of breaks and of plateletes of copolyester which part readily from the underlying film. This phenomenon is reflected in a brittleness of the adhesion primer. It is accentuated further by the coextrusion process. In fact, in the conditions of industrial film manufacture from crystallizable polyesters containing polyethylene terephthalate units, the presence of a large proportion of aliphatic diacid units in the sulphonated copolyester promotes the crystallization and the orientation of the latter. All in all, and although the aliphatic diacid units have an advantageous effect on the adhesive properties of the sulphonated copolyesters defined in the abovementioned European Patent, the latter are unsuitable for obtaining an adhesion primer by coextrusion. The objective which the present invention set itself is precisely to solve the problem presented by obtaining a primer with improved adhesion from a sulphonated copolyester containing aliphatic diacid units and capable of being coextruded with a crystallizable polyester.

More particularly:

A first subject of the present invention lies in coextruded composite films based on a crystallizable copolyester comprising an adhesion coating based on a sulphonated copolyester containing units derived from aliphatic diacids and capable of receiving final coatings starting with aqueous and/or organic compositions;

A second subject of the present invention lies in coextruded composite films based on a crystallizable copolyester comprising an adhesion primer coating based on a sulphonated copolyester containing a plurality of repeat units derived from aliphatic diacids and being poorly crystallized and/or oriented;

A third subject of the present invention lies in coextruded composite films based on a crystallizable polyester comprising an adhesion primer coating consisting of a sulphonated copolyester containing a plurality of repeat units derived from aliphatic diacids which simultaneously exhibits a good swellability by organic solvents and/or water and a reduced crystallizability under the influence of the organic solvents present in the compositions for final application coatings;

A fourth subject of the present invention lies in a process for the preparation of composite polyester films based on a crystallizable polyester comprising an adhesion primer coating based on a sulphonated copolyester containing units derived from aliphatic diacids and capable of being coextruded with a crystallizable polyester.

A fifth subject of the present invention lies in coextruded composite films based on a crystallizable polyester comprising an adhesion primer coating consisting of a sulphonated copolyester containing a plurality of repeat units derived from aliphatic diacids and a final application coating deposited onto the said adhesion primer.

More especially, a first subject of the present invention lies in new coextruded oriented composite polyester films, with improved adhesion to final application coatings, consisting of a base film (A) of a semicrystalline polyester, comprising on at least one of its faces an adjoining layer of an adhesion primer coating (B) based on a copolyester containing oxysulphonyl groups and consisting of a plurality of repeat units derived from aromatic dicarboxylic acids, aliphatic dicarboxylic acids and glycols, which are characterized in that the copolyester containing oxysulphonyl groups forming the layer (B) contains, per 100 moles of dicarboxylic acid units;

a) from 78 to 93 moles of terephthalate units;
(b) from 2 to 5 moles of units derived from an aromatic diacid containing oxysulphonyl group(s); and
c) from 5 to 17 moles of units derived from at least one alkanedicarboxylic acid containing from 4 to 15 carbon atoms.

The copolyesters containing oxysulphonyl groups defined above lend themselves particularly well to obtaining composite films by coextrusion with a crystallizable polyester under industrial film manufacture conditions and the coextruded composite films with an adhesion primer coating exhibit an excellent adhesion to various final application coatings.

A crystallizable polyester, in the present application, denotes polyesters or copolyesters which, after melt-extrusion through a die followed by drawing of the amorphous polymer, produce semicrystalline polyesters or copolyesters. The crystallinity of the polymers is determined by the usual means which are well known to the expert, such as X-ray diffraction, differential thermal analysis (cf. S.H. Lin et al., J. Polymer Sci. Polymer. Symposium 71 121–135 (1984)) and the relative density test.

the crystallizable polyesters employed for the preparation of the base layer (A) are the polyesters and copolyesters usually employed for obtaining oriented polyester films by drawing and exhibiting a semicrystalline structure after drawing.

Use may be made for this purpose of any film-forming polyester obtained from one or more dicarboxylic acid(s) or from their lower alkyl esters (terephthalic acid, isophthalic acid, 2,5-naphthalenedicarboxylic acid, 2,6-naphthalenedicarboxylic acid, 2,7-naphthalenedicarboxylic acid, succinic acid, sebacic acid, adipic acid, azelaic acid, diphenyldicarboxylic acid and hexahydroterephthalic acid).

The diols used in combination with the diacids are those usually employed to obtain crystallizable polyesters; there may be mentioned, no limitation being implied: ethylene glycol, 1,3-propanediol, 1,4-butanediol, neopentyl glycol, cyclohexanedimethanol and diethylene glycol. These diols may be employed by themselves or as mixtures. When copolyesters are called for, they must contain a sufficient proportion of the monomeric component(s) conferring crystallinity. Homopolyesters and copolyesters derived from terephthalic acid are preferably employed. In this case, the copolyesters preferably include a proportion of terephthalate units representing at least 80 mol % of the diacid units and more preferably at least 90%. The polyesters and copolyesters derived from ethylene glycol and from 1,4-butanediol constitute a preferred class of polymers employed for producing the base layer (A). The polyester is advantageously a polyethylene terephthalate whose intrinsic viscosity, measured at 25° C. in o-chlorophenol, is between 0.6 and 0.75 dl/g.

The copolyesters containing oxysulphonyl groups forming the layer B contain a plurality of groups of general formula:

$$(-SO_3)_nM \qquad (I)$$

in which:

n is equal to 1 or 2

M denotes a hydrogen atom, an alkali metal (for example sodium or potassium), an alkaline-earth metal (calcium, barium) or an ammonium or quaternary ammonium cation, which are introduced into the polymer chain by aromatic dicarboxylic acids containing one or more groups of formula (I) such as those mentioned in French Patent 1,602,002 or U.S. Pat. No. 3,779,993.

Among the aromatic diacids containing oxysulphonyl groups, those more preferably employed are acids of general formula:

$$\begin{array}{c} X \\ \diagdown \\ \diagup Z[-(SO_3)_nM]_p \\ Y \end{array} \qquad (II)$$

in which:

M and n have the meaning given already;

Z is a polyvalent aromatic radical;

X and Y are hydroxycarbonyl radicals or derivatives: esters of lower aliphatic alcohols or acids halides (chloride, bromide); and p is an integer equal to 1 or 2.

In formula (II), Z denotes more specifically a phenyl radical or a combination of 2 or more than 2 ortho- or pericondensed phenyl radicals or of two or more phenyl groups linked together by inert groups such as alkylidene (propylidene) radicals or ether, ketone or sulphone groups.

As specific examples of dicarboxylic acids containing oxysulphonyl groups there may be mentioned hydroxysulphonylterephthalic, hydroxysulphonylisophthalic (in particular 5-sulphoisophthalic acid), hydroxysulphonyl-ortho-phthalic, 4-hydroxysulphonyl-2,7-naphthalenedicarboxylic and 4,4'-hydroxysulphonyldiphenyldicarboxylic acids, hydroxysulphonyl-4,4'-dihydroxycarbonyldiphenyl sulphones, 4,4'-hydroxysulphonyldihydroxycarbonyldiphenylmethanes, 5-(hydroxysulphonylphenoxy)isophthalic acid and 5-(hydroxysulphonylpropoxy)isophthalic acid. The sulphonated copolyesters derived from hydroxysulphonylisophthalic acids are particularly suitable for the preparation of the composite films according to the invention.

For obtaining sulphonated copolyesters, the dicarboxylic acids containing oxysulphonyl groups may be employed in their acidic form or, preferably, in the form of their derivatives (halides or lower alkyl esters) which are capable of generating polyesters. The diesters methyl are preferably employed. The sulphonic group(s) of the diacid or of its derivatives is (are) preferably in the form of alkali metal salts.

Examples of alkanedicarboxylic acids which can be employed as components c) of the copolyesters containing oxysulphonyl groups which may be mentioned, no limitation being implied, are adipic, succinic, sebacic, azelaic, glutaric or suberic acids. These acids may be employed in acidic form or in the form of any derivative capable of generating a polyester; those preferably employed are the halides (chloride or bromide) or the lower alkyl esters (methyl, ethyl, propyl, butyl). It would be possible, without departing from the scope of the present invention, to combine two or more than two alkanedioic acids or their derivatives to prepare the copolyesters containing oxysulphonyl groups.

The diols which are employed to prepare the sulphonated copolyesters forming the layer (B) of the composite films according to the invention are those generally employed for preparing polyesters. Those preferably called for are saturated aliphatic diols containing from 2 to 4 carbon atoms: ethylene glycol, propylene glycol and 1,4-butanediol. These diols may be employed by themselves or mixed with each other or with diols which are more highly condensed in respect of carbon, such as 2,2-dimethyl-1,3-propanediol, 1,6-hexanediol, neopentyl glycol and cyclohexanedimethanol. In this latter case, the quantity of diol with carbon condensation higher than or equal to 5 is chose so as not to increase the crystallizability of the copolyester under the influence of the solvents; this quantity depends on the carbon condensation and on the structure of the diol considered. For the same reason, it is preferable to avoid or to limit the presence, in the sulphonated copolyester structure, of repeat units derived from polyexyalkylene glycols such as diethylene glycol, triethylene glycol, pentaethylene glycol or decaethylene glycol. Thus, the weight content of polyoxyalkylene glycol in the copolyester is preferably below or equal to 6% and still more preferably to 5%. To obtain copolyesters containing oxysulphonyl groups, use is preferably made of ethylene glycol, which can be combined, if appropriate with a minor quantity of at least one of the above-mentioned diols.

The sulphonated copolyesters described above may be prepared by the usual known processes. For this purpose, a diol or a mixture of diols may be reacted in a first step with the acidic components or their derivatives (halides or esters in the presence of an esterification or transesterification catalyst for forming the esters of the corresponding diols and then, in a second step, the polycondensation of the diol esters can be carried out in the presence of the usual catalysts.

To produce composite polyester films with improved adhesion, use is preferably made of sulphonated copolyesters containing from 2 to 5% of aromatic diacid units containing oxysulphonyl group(s), 7to 15% of alkanedioic acid units and from 80 to 90% of terephthalate units and less than 5% by weight of polyoxyalkylene glycol units. The conditions for preparing copolyesters containing oxysulphonyl groups are therefore chose so as to avoid or to limit the polyaddition of the glycol(s) during the esterification stage. From this viewpoint it is preferable, in particular, to employ the esters of the diacids and acids containing sulphonic groups in the form of alkali metal salts.

The coextruded composite polyester films with improved adhesion which form the subject of the present invention may comprise an adhesion layer (B) on one of the faces of the base film (A) or a layer (B) on each of the faces of the base film (A).

The layers (A) and/or (B) of the composite films according to the invention may, if appropriate, contain fine particles of fillers intended to modify their surface properties (roughness, friction coefficient, abrasion resistance, heat-sealability, for example). These particles may have been introduced into the polymer composition before polycondensation or after formation of the polycondensate by the usual processes or else may result from the precipitation of the catalyst residues. The quantities of added particles represent from 0.01 to 1% by weight of the polyester forming the layers (A) and/or (B) and preferably from 0.05 to 0.5% by weight. The volume median diameter of these particles is usually between 0.1 and 5 micrometers.

The inert particles which are added may be very varied in nature: they may be inorganic particles (oxides or salts of the elements of groups II, III and IV of the Periodic Classification of the elements), or else polymeric particles, By way of illustration the following may be mentioned among the fillers which can be employed: silica, silicoaluminates, calcium carbonate, titanium oxide of the anatase type, MgO, alumina and barium sulphate.

In addition to the fillers described above, the layers (A) and/or (B) of the composite films according to the present invention may contain the additives usually employed in the film industry, such as heat stabilizers, antistatic agents and the like. When the composite films according to the present invention comprise a layer (B) on each face of the base film (A), the two layers (B) may be identical or different. They may differ in thickness, the nature of the sulphonated polyester of which they are made, the presence of the absence of fillers and/or in the proportion of filler and/or in the nature and/or the particle size of the filler.

When the composite films in accordance with the invention comprise only one layer (B), the other face of the layer (A) may comprise a layer (C) which differs from the layers (A) and (B). The layer (C) may differ from the layer (A) in the nature of the polyester of which it is made and/or in the presence of fillers in either layer and/or in the nature and/or the particle size and/or the proportion of these fillers, A convenient means is therefore available for modifying the surface properties (topography of the face of the composite film according to the invention which is away from that carrying the layer (B)). It is then possible to vary its roughness, the friction coefficient and the abrasion resistance as a function of the films' end use.

The production of the composite films according to the invention is carried out by simultaneous extrusion of a crystallizable polyester to form the base film (A) and of a sulphonated copolyester. For this purpose, a stream F(A) of crystallizable polyester is extruded with the aid of a first extruder and, simultaneously, a stream (B) of the sulphonated copolyester intended to form the adhesion primer layer(s) (B) with the aid of a second extruder. The two extruders are connected to a coextrusion box in which the stream (B) may, if appropriate, be divided into two streams (B). The streams of molten polymers are converted into adjoining amorphous films by passing through a flat die. The crystallizable amorphous film (A) and the sulphonated copolyester film(s) are then subjected together to the usual film-forming operations; quenching, drawing, heat-setting and reeling.

The film-forming conditions are those usually employed industrially to obtain oriented semicrystalline polyester films. On leaving the dies, the amorphous composite film is cooled to a temperature of between 10° C. and 45° C. on a casting drum.

The conditions for drawing the extruded composite film are those usually employed in the manufacture of semicrystalline polyester films. Thus, it is possible to perform a monoaxial drawing or a biaxial drawing performed successively or simultaneously in two directions, generally at right angles, or else in sequences of at least 3 drawing operations where the drawing direction is changed in each sequence. Furthermore, each unidirectional drawing can itself be performed in several stages. It will thus be possible to combine drawing sequences, such as, for example, two successive biaxial drawing treatments, it being possible for each drawing operation to be performed in several stages.

The composite film is preferably subjected to a biaxial drawing in two perpendicular directions. It is possible, for example, first of all to perform a drawing operation in the direction of travel of the film (lengthwise drawing) and then to a drawing operation in a perpendicular direction (transverse drawing) or vice-versa. In general, the lengthwise drawing is carried out with a ratio of 3 to 5 (that is to say that the length of the drawn film represents from 3 to 5 times the length of the amorphous film) and at a temperature of 80° to 135° C., and the transverse drawing is carried out with a ratio of 3 to 5, at a temperature of 90° to 135° C. and preferably between 100° and 125° C.

After drawing, the composite film is subjected to a heat-treatment at a temperature of between 160° and 240° C. The best results in respect of adhesion of the final coatings are obtained with heat-setting temperatures of between 220° and 235° C., according to the composition of the copolymer forming the layer(s) (B).

To obtain an adhesion which is as high as possible, when the heat-setting temperature is below 220° C., it is preferable to increase the temperature of lengthwise drawing and more particularly to raise it to a value of between 120° and 135° C.

The drawing can also be carried out simultaneously, that is to say simultaneously in the lengthwise direction and in the transverse direction, for example with a ratio of 3 to 5 and at a temperature of 80° to 120° C.

The throughput of the extruders depends on the thicknesses which it is desired to impart to the layers (A) and (B). The thickness of the layer (A) is a function of the intended application. If a so-called thin film is involved, intended for the manufacture of magnetic tapes or of packaging, for example, the thickness of the film (A) is below or equal to 40 micrometers (from 5 to 40 micrometers); if thick films are involved, as used in the (graphic arts, the film (A) has a thickness greater than 40 micrometers and capable of reaching 300 micrometers. In the coextruded composite films according to the invention, the thickness of (or of each) layer B is generally between 0.1 and 5 micrometers and preferably between 0.1 and 2.5 micrometers. The coextrusion equipment used for the manufacture of the coextruded composite films is that usually employed in the industry. These devices comprise two or three extrusion heads fed by extruders.

It would be possible, without departing from the scope of the present invention, to obtain composite films with a sulphonated adhesion primer by coextrusion of the crystallizable polyester and of at least one stream of sulphonated copolyester through an annular die, followed by blowing of the coextruded composite sleeve.

The coextruded composite films according to the present invention exhibit an improved adhesion to a very wide variety of final coatings employed in the field of thin films or in the field of thick films. More particularly, they exhibit an improved adhesion to the inks employed in the field of packaging film, to metal coatings (for example to aluminium), to barrier layers (polyvinyl alcohol, vinyl alcohol/ethylene copolymers, polyvinylidene chloride, polyvinyolidene fluoride and the like), and to heat-sealing layers. The composite polyester films also exhibit an improved adhesion to the final coatings employed in the graphic arts, such as matting layers, diazo coatings, antistatic coatings, powdered inks for reproduction, irradiation-crosslinkable paints and varnishes, dielectric inks, and the like.

The composite films obtained by deposition, using any suitable means (coating in line or out of line, extrusion-coating, lamination, metallizing, and the like) of a final application coating onto the composite films of the present invention form another subject of the invention.

More specifically, a further subject of the present invention is composite polyester films comprising a) a coextruded oriented composite polyester film consisting of a base film (A) of a semicrystalline polyester comprising on at least one of its faces an adjoining layer of an adhesion primer coating (B) based on a copolyester containing oxysulphonyl groups containing a plurality of repeat units derived from aromatic dicarboxylic acids, alkanedioic acids and glycols, and b) a final application coating deposited onto at least one of the adhesion primer layers (B), characterized in that the copolyester containing oxysulphonyl groups forming the said layer (B) comprises, per 100 moles of repeat units derived from dicarboxylic acids:

a) from 75 to 93 moles of terephthalate units;
b) from 2 to 5 moles of units derived from at least one dicarboxylic aromatic acid containing oxysulphonyl group(s); and
c) from 5 to 17 moles of units derived from an alkanedioic acid containing from 4 to 15 carbon atoms.

When the coextruded composite film comprises an adhesion primer layer (B) on each face of the base (A), a final application coating can be placed on each of the layers (B); thus, for example, one of the faces of the composite film may carry a layer of aluminium, and the other a coating improving the heat-sealability (polyethylene) or the gas-imperviousness properties f(for example polyvinyl alcohol).

The following examples illustrate the invention and show how it can be put into practice. In these examples, the tests whose description is given below have been employed;

1) Determination of the film properties:
a) Average roughness Ra (also called CLA roughness, from the expression "center line average");
b) Total roughness Rt or peak/valley height;
Ra and Rt are defined in ISO Standard R 468 and measured according to the methods described in this standard. The measurement corresponds to the average of 10 results; the various measurement factors are as follows:
filtering threshold (or "cut-off"): 0.08 mm
tracing length: 1.75 mm
radius of curvature of the stylus: 5 micrometers.
stylus pressure force: 50 mg
c) Percentage of transmitted scattered light:
This measurement, which characterizes the film haze, is carried out according to ASTM Standard D 100 (it is also referred by the term "haze" which will be used hereinafter for convenience sake.

2) Determination of the adhesion properties:
To carry out this determination, the composite films according to the invention are provided on the layer(s) B with a final application coating by automatic coating using a Hand Coater trademark apparatus whose engraved coating bar is chose so as to deposit 7 g of composition per m². The coated films are dried in a ventilated oven at a temperature and for a period which are appropriate for each composition.

The determination of the adhesion of the final coatings to the base composite film is carried out according to the two methods described below:

a) Manual method with visual assessment
Tests of peeling of the final coating using an adhesive tape of specified trademark are carried out on 15 cm×20 cm film samples. The tape is applied by hand and the peeling is performed under the following conditions:
a) slow peeling
b) fast peeling
c) peeling with previous scratching of the final coating using a razor blade,
d) peeling with previous creasing of the film.

For each type of peeling, the resistance of the final coating is scored from 1 (easy complete peeling of the coating) to 10 (perfect retention of the coating). Lastly, an overall score from 1 to 10, taking into account the scores given for each of the conditions a) to d) gives an overall assessment of the peeling strength of the final coatings for each of the tests.

b) Method of measuring the peeling (or delamination) strength
This method of measuring the peeling strength of the final coating is conducted as follows:
an adhesive tape of a specified trademark is deposited without pressure onto a specimen of coated film 20 cm in length and 4 cm in width, cut out in the long direction of the film, leaving remaining a leader of coated film and a leader of adhesive tape 4 cm in length. The specimen/adhesive tape assembly is placed on a marble slab and then a 4 kg roller travels over it at a rate of 5 forward and reverse strokes, starting from the side away from the leader.

The coated film leader is attached firmly to a stationary jaw connected to a force sensor which delivers a voltage of 10 volts per 25 daN or 5 daN, itself connected to a digital oscilloscope permitting the acquisition and the processing of the electrical signal supplied by the sensor as a function of time. The oscilloscope is connected to a plotter enabling the curve of change in the electrical voltage to be recorded as a function of time. The oscilloscope also makes it possible to integrate the signal over the total length of the specimen. The adhesive tape leader is fastened in a movable jaw attached firmly to a metal traction cable; the second end of the cable is connected to a wheel 195 mm in diameter, set in rotation by a 0.5 h.p. motor capable of rotating at speeds from 16 to 144 rev/min and imparting to the movable jaw a linear velocity which can lie between 9.8 and 88 m/min. The sensor connected to the stationary jaw and the motor are attached to the two ends of a U-shaped rigid iron frame 1.6 m in length.

During the measurement of the peeling strength, the speed of rotation of the motor is set so as to make the rate of delamination 1 m/s. The oscilloscope is switched on and then the motor is started up. The electrical signal is then integrated over all or part of the length of the specimen and the mean delaminating force is then calculated taking into account the sensitivity of the sensor employed (25 daN or 5 daN) per 10 volts and of the length of the adhesive tape.

Depending on the nature of the final coating, use is made of an adhesive tape 2.5 cm in width, sold under the trademark Scotch 396 by the Minnesota Mining Manufacturing Co. (3M) or of an adhesive tape 2.5 cm in width, sold under the trademark Tesaband 4651 by the Tesa company.

EXAMPLE 1 a) Preparation of a copolyester containing oxysulphonic groups

The following are introduced cold into a 300-liter stainless steel reactor equipped with an anchor stirrer, a jacket for circulating a heat-transfer liquid, a thermocouple and a distillation column controlled by a relay valve:

104.042 kg (536.3 moles) of dimethyl terephthalate (DMT);
6.423 kg (21.7 moles) of dimethyl 5-sulphoisophthalate (DMSIP);
10.788 kg (62 moles) of dimethyl adipate (DMA);
76.88 kg (1,240 moles) of ethylene glycol;
10.7 g of titanium aminotriethanolate as transesterification catalyst;
75.29 of antimone trioxide as polycondensation catalyst and 1.981 g of sodium acetate.

The stirring is started up and the reactor contents are quickly heated to 180° C., at which temperature methanol begins to distill. The temperature in the reaction mixture is brought up to 220° C. over 2 h 40 min. Excess glycol is removed by distillation between 220° and 250° C. over 1 hour.

The reaction mass is then transferred to an autoclave heated to 250° C. The pressure is reduced to 0.5 torr. The polycondensation is continued for 2 h 15 min so as to obtain a copolyester with a viscosity value equal to 52.4, measured on a solution at a concentration of 1% by weight in ortho-chlorophenol at 25° C. The pressure in the autoclave is returned to 760 torr by introducing nitrogen and the molten copolyester is then drawn off under a casting wheel and granulated.

The copolyester thus obtained (104 kg) is then subjected to the following determinations:
- determination of the end carboxylic groups by potentionmetry using a 0.2N aqueous solution of sodium hydroxide, starting with a solution at a concentration of 1% by weight of copolyester in ortho-cresol (that is 15.6 molar equivalents/tonne);
- determination of the methoxy groups by degradation with hydroiodic acid and determination by gas chromatography on a solution in ortho-cresol (that is 8.9 molar equivalents per tonne);
- determination of the diethylene glycol units by gas chromatography after saponification of the copolyester (3.17% by weight of the copolyester).

It contains 86.5 mol % of terephthalate units 10 mol % of adipate units and 3.5 mol % of 5-sulphoisophthalate units.

The copolyester described above has a number-average molecular mass Mn, measured at 80° C. in N-methylpyrrolidone, of 23,000, a glass transition temperature of 55° C., a melting temperature of 230° C., a temperature of onset of crystallization of 120° C. and a crystallization peak temperature of 142° C. In what follows, this copolyester will be referred to by the reference B-1.

The copolyester B-1 was dried in a fluidized bed dryer for 1 hour at 175° C. and was then introduced into leakproof bags. After drying, it has a water content of 50 parts per million (ppm) and the granules do not give rise to any sticking.

b) Preparation of a composite film

A composite film comprising a layer (A) of a polyethylene terephthalate and two layers (B) of copolyester B-1 on both sides of the layer (A) is prepared by coextrusion using a device comprising a main extrusion line and two satellite lines.

The main extrusion line has a throughput of 910 kg/hour of polyethylene terephthalate (PET) exhibiting a viscosity value of 64, measured at 25° C. on a solution at a concentration of 1% by weight in ortho-chlorophenol. The PET (A) consists of a mixture of 60 parts of an unfilled PET and of 40 parts of the same PET containing 0.2% by weight of silica with a mean particle diameter equal to 1 micrometer, determined by means of an instrument for determining particle size using light scattering.

The temperature of the main extrusion line is 280° C.

The two satellite lines have a throughput of 15 kg/hour of copolyester B-1 and operate at a temperature of between 250° and 260° C.

The three polyester streams are extruded through a flat die. The coextruded sheet is quenched on a cooling drum maintained at 35° C. and is then subjected to lengthwise drawing to a ratio of 3.32 at a temperature of 115° C. and then to transverse drawing to a ratio of 3.37 in a zone maintained at a temperature of between 105° and 120° C. The biaxially drawn composite film is subjected to a heat-setting operation at 225°–230° C., and is cooled and reeled.

A composite film is obtained in this way, referred to below as F(B1) of B1/A/B1 type, with a total thickness of 50 micrometers and whose B-1 layers have a thickness of 0.4 micrometers.

The F(B1) film thus prepared has an average roughness Ra of 0.045 $\mu$m, a total roughness Rt of 0.75 $\mu$m and a percentage of transmitted scattered light of 9.2. The F(B1) film was coated according to the method described above, using the following matting compositions:

Composition No. 1

Matting composition for a film to be sensitized, consisting of a solution of cellulose acetopropionate in an acetone (88% by volume)/methanol (12% by volume) mixture, containing silica. The total solids content of the composition is 25% by weight; the cellulose acetopropionate represents 66.6% by weight of the solids content and the silica 33.3% by weight.

Composition No. 2

Matting composition for a drawing film, consisting of a solution of polyvinyl alcohol (PVA) in a methanol (87% by volume)/water (13% by volume) mixture containing a melamine/formaldehyde resin and silica. The solids content of the composition is 20% by weight; the PVA binder represents 50% by weight of the solids content and the silica 50%.

Samples of coated F(B1) film were then subjected to tests to determine the adhesion of the coating to the F(F1) base using Scotch 396 adhesive tape; the results obtained are shown in table (I) which follows.

TABLE I

| Composition No. 1 | | Composition No. 2 | |
|---|---|---|---|
| F in g/cm (1) | Score | F in g/cm (1) | Score |
| 250 | 10 | 30 | 10 |

(1) Delaminating force

EXAMPLES 2 TO 5

The operating procedure of Example 1 was used to prepare suitable sulphonated copolyesters for obtaining composite films according to the present invention and, by way of comparison, suitable sulphonated copolyesters for coating according to the state of the art. The composition and the physical characteristics of these copolyesters are shown in table (II).

Using the operating procedure of Example 1, the copolyesters B2 to B5 and the copolyesters BC-1 and BC-2 were coextruded with the standard PET defined in Example 1 in the form of composite films of B/A/B type.

It was not possible to obtain sufficient lengths of coextruded films of this type with the sulphonated copolyesters BC3 to BC7 because of breaking of the films under the conditions for industrial production of the PET base film.

TABLE II

| Copolyester ref. | TA % (1) | Aliphatic units Nature | % | SIA % (2) | DEG % (3) | VV (4) | Mn | $T_g$ °C. (5) | $T_C$ °C. (6) | $T_m$ °C. (7) | COOH (8) | —OCH₃ (9) |
| --- | --- | --- | --- | --- | --- | --- | --- | --- | --- | --- | --- | --- |
| B 2 | 81.5 | adipate | 15 | 3.5 | 4.35 | 69.9 | 28570 | 54 | 133 | 208 | 15.2 | 1 |
| B 3 | 86.5 | " | 10 | " | 2.75 | 51 | 25000 | 55 | 132 | 230 | 16 | 5.5 |
| B 4 | 86.5 | sebacate | " | " | 5 | 71 | | 51 | 132 | 210 | 26.5 | 3.8 |
| B 5 | 81.5 | " | 15 | " | 4.8 | 69 | | 30 | 136 | 204 | 9.8 | 0.9 |
| BC 1 | 90 | adipate | 10 | 0 | 1.1 | 93 | | 54 | | | 5.8 | 1.3 |
| BC 2 | 86.5 | " | " | 3.5 | 6 | 55.4 | | 51 | | 212 | 7.2 | 0.9 |
| BC 3 | 76.5 | " | 20 | 3.5 | 5.4 | 73 | | 26.5 | | | 6.6 | 4.1 |
| BC 4 | 66.5 | " | 30 | 3.5 | 5.3 | 79 | | 20 | | | 5.7 | 0.9 |
| BC 5 | 83 | " | 10 | 7 | 10.8 | 60 | | 41.7 | | | 25.7 | 9.1 |
| BC 6 | 73 | " | 20 | 7 | 7.52 | 63 | | 32 | | | 14.3 | 9.3 |
| BC 7 | 73 | sebacate | 20 | 7 | 6.4 | 65 | | 24 | | | 21.3 | 16.1 |

(1) terephthalic acid units;
(2) 5-sulphoisophthalic units;
(3) diethylene glycol;
(4) viscosity value;
(5) transition temperature;
(6) crystallization temperature;
(7) melting temperature;
(8) number of carboxyl groups;
(9) number of methoxy groups.

The composite films FB-2 to FB-5 and F-BC-1 to F-BC-2 obtained were coated according to the operating procedure already described. See composite film No. 1 defined in Example 1 and were subjected to the adhesion tests. The results obtained are given in table III.

TABLE III

| Ex | Film ref. | Score | F in g/cm |
| --- | --- | --- | --- |
| 2 | FB 2 | 8 | 270 |
| 3 | FB 3 | 9 | 260 |
| 4 | FB 4 | 9 | 280 |
| 5 | FB 5 | 8 | |
| | FBC 1 | 3 | 65 |
| | FBC 2 | 6 | 150 |

EXAMPLE 6

A metallized film was prepared by depositing a layer of aluminum onto one of the faces of the FB1 film described in Example 1 by a vacuum metallization according to the usual process. The metallized film thus obtained was subjected to two tests for measuring the delaminating force:

Method employed in Example 1

The following adhesive tapes were employed:
Tape sold by the 3M company under the trademark Scotch 396 (width 25 mm),
tape sold by the Tesa company under the trademark Tesaband 4651 (width 25 mm).

4 measurements were carried out using the Scotch tape, resulting in a mean value of the delaminating force of 300 g/cm, which corresponds to the force needed to cause the tape to separate from the metal layer; inspection of the latter shows that no peeling of the metal occurred. On the contrary, a partial transfer of the adhesive onto the metal layer was observed.

With the Tesaband tape, the tape/metal layer delaminating force is 140 g/cm (mean of 3 tests). All of the metal layer remained on the polyester base.

Method 2

An adhesive tape sold by the Primacor company under the trademark Primacor 3460 (width 20 mm, length 150 mm) is placed on a specimen of metallized film 20 mm in width and 150 mm in length, cut out in the lengthwise direction of the initial film. A 2.5 cm length of the composite obtained is inserted between the two jaws of a press, one of which is heated, the adhesive tape being in contact with the heated jaw. The adhesive tape and the metallized film are sealed by applying a pressure of 3.5 kg/cm² for one second at a temperature of the heated upper jaw of 106° C.

The unsealed parts of the composite are inserted and each is clamped in a jaw of an Instron trademark apparatus for measuring the delaminating force, immediately after having been kept for 1 hour at 23° C. in an enclosure at 50% relative humidity. The metallized film leader is inserted in the movable jaw and the adhesive tape leader in the stationary jaw; the delamination angle is maintained at 90° by means of an aluminium ruler 20×10 mm in section. A pull is then applied to the sealed part by causing the movable jaw to travel at a speed of 2 m/min. The force needed to cause the failure of the bond between two of the layers of the composite (delaminating force) is recorded. The measurement is repeated on five samples and the average of the five values obtained is calculated. The optical density of the metallized film samples is also measured before and after the test and the percentage area of metal which is peeled off is determined.

The following results were obtained in this case:
average of the delaminating force: 457 g/cm
percentage area of metal peeled off: 0
optical density of the metallized film:
before the test: 2.4
after the test: 2.4

These tests show an excellent adhesion of the metal coating to the polyester base.

EXAMPLE 7

The operating procedure of Example 1 was used to prepare a composite film 12 μm in thickness by coextrusion of the copolyester B1 and of the polyester A described in this example. The main extrusion line is fed with PET (A) at a throughput of 645 kg/h and the satellite lines with copolyester B1 at a throughput of 15 kg/h.

A composite film of the B1/A/B1 type is obtained in this way, in which each of the B1 layers has a thickness of 0.12 μm, exhibiting a percentage of scattered light equal to 3.7, roughness values Ra and Rt of 0.045 and 0.902 respectively, a shrinkage at 150° C. of 0.02% in the lengthwise direction and a modulus of 435 kg/mm² in the lengthwise direction.

The composite film described above was subjected to vacuum metallization with aluminium on one of its 2 faces. The optical density of the metal coating had a value of 3.2.

The metallized film was subjected to a measurement of the delaminating force using the method 2 described in Example 6. The following results were obtained:
average of the delaminating force: 65 g/20 mm
percentage area of metal peeled off: 0
optical density of metallized film after the test: 3.1.

EXAMPLE 8

A laminated film was prepared from the metallized composite film described in Example 7 by assembling in a known manner with a polyethylene film 0.32 μm in thickness placed on the metallized face of the composite with the aid of an adhesive sold by the Morton company under the trademark Morton 575 S and with a 38-μm polyethylene film placed with the aid of the same adhesive onto the unmetallized face of the composite film.

The delaminating force of the polyethylene/metal bond and of the PET/polyethylene bond in the lengthwise direction and then in the transverse direction was measured on specimens 25 mm in width, prepared so as to leave free 20-mm leaders of each of the layers making up the laminate. These leaders are introduced into the jaws of a measuring apparatus, 4 cm apart. A pull is then applied to the leaders at a speed of 300 mm/min. The following results were obtained:
1) Delamination in the lengthwise direction
   a) between metal and polyethylene;
      delaminating force: 680 g/25 mm
      no peeling of the metal
   b) between the PET face and the polyethylene:
      There was no delamination
2) Delamination in the transverse direction
   a) between metal and polyethylene:
      delaminating force 700 g/25 mm
      no metal peeling off
   b) between PET and polyethylene: no delamination.

EXAMPLE 9

A composite film of B1/A/B1 type 50 μm in thickness was prepared by coextrusion of the materials described in Example 1 under the following conditions:
lengthwise drawing
ration 3%
temperature 90° C.
transverse drawing
ratio 3%
temperature 120° C.
heat-setting 230° C.
main line throughput: 910 kg/h
satellite line throughputs: 15 kg/h.

The film obtained has substantially the same properties as that described in Example 1. Onto the drum face of this film are deposited 7 to 8 g/m² of a matting coating composition comprising a polymeric binder in solution in a mixture of solvents consisting chiefly of methyl ethyl ketone and acetone, and containing silica, and the coated film is then dried at 140° C. The dry coated film is then maintained at 150° C. for 1 min.

Coated film specimens 20 cm in length and 4 cm in width are then cut out in the middle of the width and in the lengthwise direction and are subjected to tests to determine the adhesion of the coating to the base with the aid of Scotch 396 adhesive tape.

The results were as follows:
Score: 9
Delaminating force: 729 g/cm.

EXAMPLES 10 TO 11

Example 9 was repeated while the film production conditions were varied, all other conditions being otherwise identical. The film production conditions and the results of the adhesion measurements are shown in the table below.

| Ex. | L-DR (1) RATIO % | TEMP. °C. | TR-DR (2) RATIO | TEMP. °C. | H-S TEMP. (3) °C. | SCORE | F in g/cm |
|---|---|---|---|---|---|---|---|
| 10 (4) | 3 | 130 | 3.4 | 120 | 170 | 9 | 630 |
| 11 | 3 | 130 | 3.4 | 110 | 230 | 9 | 1041 |

(1) lengthwise drawing
(2) transverse drawing
(3) heat-setting temperature
(4) in this test the coated film was not maintained at 150° C. for 1 min after drying.

EXAMPLES 12 TO 14

Example 9 was repeated, replacing the copolymer B1 with the copolymer B4 of Example 4 to prepare a composite film of B4/A/B4 type 50 μm in thickness.

The film production conditions and the results of the adhesion assessment tests are shown in the following table:

| Ex. | L-DR RATIO % | TEMP. °C. | TR-DR RATIO | TEMP. °C. | H-S TEMP. (3) °C. | SCORE | F in g/cm |
|---|---|---|---|---|---|---|---|
| 12 (1) | 3.4 | 130 | 3 | 120 | 170 | 10 | 909 |
| 13 | 3.4 | 90 | 3 | 120 | 230 | 8 | 791 |
| 14 | 3 | 130 | 3.4 | 110 | 230 | 10 | 805 |

(1) in this test the coated film was not maintained at 150° C. for 1 min.

We claim:
1. Coextruded oriented composite polyester films, with improved adhesion to final application coatings, comprising a base film (A) of a semicrystalline polyester, comprising on at least one of its faces an adjoining layer coextruded thereon of an adhesion primer coating (B) based on a copolyester having oxysulphonyl groups, comprising a plurality of repeat units derived from aromatic dicarboxylic acids, aliphatic dicarboxylic acids and glycols, wherein the copolyester having ox- ysulphonyl groups forming the layer (B) comprises, per 100 moles of dicarboxylic acid units:
a) from 78 to 93 moles of terephthalate units;
b) from 2 to 5 moles of units derived from an aromatic diacid having oxysulphonyl group(s); and
c) from 5 to 17 moles of units derived from at least one alkanedicarboxylic acid having from 4 to 15 carbon atoms.

2. Coextruded oriented composite polyester films with improved adhesion to final application coatings, according to claim 1, wherein the copolyester forming the layer (B) contains a plurality of oxysulphonyl groups of general formula:

$$(-SO_3)_n M \qquad (I)$$

in which:
n is equal to 1 or 2, and
M denotes a hydrogen atom, an alkali or alkaline-earth metal, an ammonium cation or a quaternary ammonium cation.

3. Coextruded oriented composite polyester films with improved adhesion to final application coatings, according to claim 1 wherein the sulphonated copolyester forming the layer (B) comprising a plurality of units derived from aromatic diacids or their derivatives of formula:

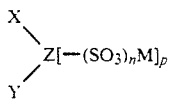
$$\begin{array}{c} X \\ \phantom{X} \diagdown \\ \phantom{XX} Z[-(SO_3)_n M]_p \\ \phantom{X} \diagup \\ Y \end{array} \qquad (II)$$

in which:
n is equal to 1 or 2,
M denotes a hydrogen atom, an alkali metal, an alkaline-earth metal, an ammonium cation or a quaternary ammonium cation,
Z is a polyvalent aromatic radical,
X and Y are hydroxycarbonyl radicals or derivatives: esters of lower aliphatic alcohols or acid halides, and
p is an integer equal to 1 or 2.

4. Coextruded oriented composite polyester films with improved adhesion to final application coatings, according to claim 3, wherein the sulphonated copolyester forming the layer (B) contains a plurality of units derived from hydroxysulphonylisophthalic acids or from their alkali or alkaline-earth metal or ammonium salts.

5. Coextruded oriented composite polyester films with improved adhesion to final application coatings, according to claim 1 wherein the sulphonated copolyester forming the layer (B) comprises a plurality of units derived from 5-hydroxysulphonylisophthalic acid or from its alkali or alkaline-earth metal or ammonium salts.

6. Coextruded oriented composite polyester films with improved adhesion to final application coatings, according to claim 1 wherein the sulphonated copolyester forming the layer (B) comprises a plurality of repeat units derived from alkanedioic acids, selected from the group consisting of succinic, adipic, sebacic, azelaic, glutaric and suberic acids.

7. Coextruded oriented composite polyester films with improved adhesion to final application coatings, according to claim 1 wherein the sulphonated copolyester forming the layer (B) comprising a plurality of units derived from saturated aliphatic diols containing from 2 to 4 carbon atoms.

8. Coextruded oriented composite polyester films with improved adhesion to final application coatings, according to claim 1, wherein the sulphonated copolyester forming the layer (B) comprises 6% or less by weight of repeat units derived from polyoxyalkylene diols.

9. Coextruded oriented composite polyester films with improved adhesion to final application coatings, according to claim 1, wherein the semicrystalline polyester forming the layer (A) is a polyalkylene terephthalate or a copolyester comprising at least 80 mol % of terephthalate repeat units.

10. Coextruded oriented composite polyester films with improved adhesion to final application coatings, according to claim 1, wherein their total thickness lies within a range of 5 to 300 micrometers and the thickness of the layer(s) (B) in a range from 0.1 to 5 micrometers.

11. Coextruded oriented composite polyester films, with improved adhesion to final application coatings, according to claim 9, wherein said polyalkylene terephthalate comprises polyethylene terephthalate.

12. Process for obtaining oriented composite polyester films with improved adhesion to final application coatings, according to claim 1, comprising performing the coextrusion through a slit die of a stream (A) of a crystallizable polyester and of at least one stream (B) of a copolyester having oxysulphonyl groups containing, per 100 moles of repeat units derived from dicarboxylic acids:
a) from 78 to 93 moles of terephthalate units;
b) from 2 to 5 moles of units derived from an aromatic diacid having oxysulphonyl group(s); and
c) from 5 to 17 moles of units derived from at least one alkanedicarboxylic acid
having from 4 to 15 carbon atoms, in the form of an amorphous composite film comprising a layer (A) of crystallizable amorphous polyester and at least one layer (B) of sulphonated copolyester, and then cooling, drawing and heat-setting the composite film resulting from the coextrusion.

13. Complex composite polyester films comprising a) a coextruded oriented composite polyester film comprising a base film (A) of a semicrystalline polyester comprising on at least one of its faces an adjoining layer of an adhesion primer coating (B) based on a copolyester having oxysulphonyl groups comprising a plurality of repeat units derived from aromatic dicarboxylic acids, from alkanedioic acids and from glycols, and b) a final application coating on at least one of the layers of the adhesion primer (B), wherein said layer (B) comprises a copolyester having oxysulphonyl groups according to claim 1.

14. Complex composite polyester films according to claim 13, wherein the final application coating is a matting coating.

15. Complex composite polyester films according to claim 14, wherein the matting coating comprises a crosslinked polyvinyl alcohol binder having silica.

16. Complex composite polyester films according to claim 14, wherein the matting coating comprises a cellulose acetopropionate binder having silica.

17. Complex composite polyester films according to claim 13, wherein the final application coating comprises a metal layer.

18. Complex composite polyester films according to claim 17, wherein said metal is aluminium.

* * * * *